United States Patent
Fawcett

(10) Patent No.: US 10,152,516 B2
(45) Date of Patent: Dec. 11, 2018

(54) MANAGING STALENESS LATENCY AMONG APPLICATION BUNDLES

(71) Applicant: International Business Machines Corporation, Armonk, NY (US)

(72) Inventor: Bradley W. Fawcett, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 14/718,310

(22) Filed: May 21, 2015

(65) Prior Publication Data

US 2016/0342659 A1 Nov. 24, 2016

(51) Int. Cl.
- *G06F 17/30* (2006.01)
- *H04L 29/06* (2006.01)
- *H04L 29/08* (2006.01)

(52) U.S. Cl.
CPC ...... *G06F 17/30516* (2013.01); *H04L 65/601* (2013.01); *H04L 67/10* (2013.01); *H04L 67/34* (2013.01)

(58) Field of Classification Search
CPC . G06F 17/30516; H04L 65/601; H04L 67/10; H04L 67/34
See application file for complete search history.

(56) References Cited

U.S. PATENT DOCUMENTS

| | | |
|---|---|---|
| 5,008,814 A | 4/1991 | Mathur |
| 5,421,012 A | 5/1995 | Khoyi et al. |
| 5,687,369 A | 11/1997 | Li |
| 5,892,935 A | 4/1999 | Adams |
| 5,909,581 A | 6/1999 | Park |
| 6,035,423 A | 3/2000 | Hodges et al. |
| 6,047,128 A | 4/2000 | Zander |
| 6,314,565 B1 | 11/2001 | Kenner et al. |
| 6,347,396 B1 * | 2/2002 | Gard .......... G06F 8/67 707/999.01 |
| 6,493,871 B1 | 12/2002 | McGuire et al. |
| 6,651,249 B2 | 11/2003 | Waldin et al. |
| 6,938,075 B1 | 8/2005 | Abbott et al. |
| 7,171,606 B2 | 1/2007 | Blackburn et al. |

(Continued)

FOREIGN PATENT DOCUMENTS

DE 102016208672 A1 11/2016

OTHER PUBLICATIONS

Fawcett, Bradley W., "Managing Staleness Latency Among Application Bundles", U.S. Appl. No. 14/752,852, filed Jun. 27, 2015.

(Continued)

*Primary Examiner* — Etienne P Leroux
*Assistant Examiner* — Husam Turki Samara
(74) *Attorney, Agent, or Firm* — Erik K. Johnson

(57) ABSTRACT

Disclosed aspects include managing an application bundle for processing a stream of tuples. The stream of tuples to be processed by a plurality of processing elements operating on a set of compute nodes is received. The stream of tuples is processed on a first compute node using the application bundle. A staleness factor with respect to the application bundle is detected by the first compute node. Based on a maintenance criterion related to both the application bundle and the plurality of processing elements, the application bundle is maintained on the first compute node.

3 Claims, 10 Drawing Sheets

(56) References Cited

U.S. PATENT DOCUMENTS

| | | |
|---|---|---|
| 7,386,845 B1 | 6/2008 | Fox et al. |
| 7,401,133 B2 | 7/2008 | Huang et al. |
| 7,478,382 B2 | 1/2009 | Menahemi et al. |
| 7,734,717 B2 | 6/2010 | Saarimäki et al. |
| 7,770,168 B1 | 8/2010 | Howarth et al. |
| 8,429,642 B1 | 4/2013 | Cheng et al. |
| 8,533,702 B2 | 9/2013 | Ballard et al. |
| 8,589,911 B1 | 11/2013 | Sharkey et al. |
| 8,627,311 B2 | 1/2014 | Auer |
| 8,667,479 B2 | 3/2014 | Johnsson et al. |
| 8,799,886 B1 | 8/2014 | Giannini et al. |
| 8,799,889 B2 | 8/2014 | Jones et al. |
| 8,910,140 B1 | 12/2014 | Giannini et al. |
| 9,112,813 B2 | 8/2015 | Jackson |
| 9,122,711 B1 | 9/2015 | Nicolini et al. |
| 9,128,793 B2 | 9/2015 | Wang et al. |
| 9,635,129 B2 | 4/2017 | Baldwin |
| 9,817,646 B1 | 11/2017 | Chen et al. |
| 9,888,057 B2 | 2/2018 | Fawcett |
| 9,900,374 B2 | 2/2018 | Fawcett |
| 2002/0111720 A1 | 8/2002 | Holst et al. |
| 2002/0133491 A1 | 9/2002 | Sim et al. |
| 2003/0079154 A1 | 4/2003 | Park et al. |
| 2003/0233483 A1 | 12/2003 | Melchione et al. |
| 2004/0003387 A1 | 1/2004 | Ballard et al. |
| 2004/0019889 A1 | 1/2004 | Melchione et al. |
| 2004/0194059 A1 | 9/2004 | Akella et al. |
| 2005/0216559 A1 | 9/2005 | Manion et al. |
| 2005/0289538 A1 | 12/2005 | Black-Ziegelbein et al. |
| 2006/0070058 A1 | 3/2006 | Menahemi et al. |
| 2006/0143350 A1 | 6/2006 | Miloushev et al. |
| 2006/0195840 A1 | 8/2006 | Sundarrajan et al. |
| 2007/0094270 A1 | 4/2007 | Gallino et al. |
| 2007/0106622 A1 | 5/2007 | Boomershine et al. |
| 2007/0239859 A1 | 10/2007 | Wilkinson et al. |
| 2008/0028401 A1 | 1/2008 | Geisinger |
| 2008/0034071 A1 | 2/2008 | Wilkinson et al. |
| 2008/0133650 A1 | 6/2008 | Saarimaki et al. |
| 2009/0018847 A1 | 1/2009 | Vanbeck et al. |
| 2009/0222505 A1 | 9/2009 | Pavan et al. |
| 2009/0271781 A1 | 10/2009 | Cui et al. |
| 2010/0124196 A1 | 5/2010 | Bonar et al. |
| 2010/0162233 A1 | 6/2010 | Ku et al. |
| 2011/0010461 A1 | 1/2011 | Lassila et al. |
| 2011/0276957 A1 | 11/2011 | Johnsson et al. |
| 2011/0307582 A1 | 12/2011 | Iwaya et al. |
| 2012/0036220 A1 | 2/2012 | Dare et al. |
| 2012/0042309 A1 | 2/2012 | Risan |
| 2012/0054345 A1 | 3/2012 | Sahu et al. |
| 2012/0102369 A1 | 4/2012 | Hiltunen et al. |
| 2012/0124187 A1 | 5/2012 | Onda et al. |
| 2012/0151190 A1 | 6/2012 | Usuba |
| 2012/0198438 A1 | 8/2012 | Auer |
| 2013/0080600 A1* | 3/2013 | Santosuosso ..... G06F 17/30587 709/219 |
| 2013/0103787 A1 | 4/2013 | Glover et al. |
| 2013/0104121 A1 | 4/2013 | Iwaya et al. |
| 2013/0139142 A1 | 5/2013 | Ikawa et al. |
| 2013/0151711 A1 | 6/2013 | Jackson |
| 2013/0198318 A1 | 8/2013 | Branson et al. |
| 2013/0219211 A1 | 8/2013 | Gopinath et al. |
| 2013/0283259 A1 | 10/2013 | Ellis et al. |
| 2014/0019957 A1 | 1/2014 | Wang et al. |
| 2014/0023037 A1 | 1/2014 | Kalmbach et al. |
| 2014/0025986 A1 | 1/2014 | Kalyanaraman et al. |
| 2014/0095591 A1 | 4/2014 | Chan et al. |
| 2014/0136794 A1 | 5/2014 | Raman |
| 2014/0222997 A1 | 8/2014 | Mermoud et al. |
| 2014/0344803 A1 | 11/2014 | Wang et al. |
| 2014/0359598 A1 | 12/2014 | Oliver et al. |
| 2015/0127774 A1 | 5/2015 | Hitomi et al. |
| 2015/0142880 A1 | 5/2015 | Arai et al. |
| 2015/0254094 A1 | 9/2015 | Cao et al. |
| 2016/0156715 A1 | 6/2016 | Larouche et al. |
| 2016/0162283 A1 | 6/2016 | Lightner et al. |
| 2016/0292011 A1 | 10/2016 | Colson et al. |
| 2016/0342402 A1 | 11/2016 | Fawcett |
| 2016/0342404 A1 | 11/2016 | Fawcett |
| 2016/0342405 A1 | 11/2016 | Fawcett |
| 2016/0342607 A1 | 11/2016 | Fawcett |
| 2016/0344786 A1 | 11/2016 | Fawcett |
| 2016/0344793 A1 | 11/2016 | Fawcett |
| 2016/0344799 A1 | 11/2016 | Fawcett |
| 2016/0344811 A1 | 11/2016 | Fawcett |
| 2016/0344843 A1 | 11/2016 | Fawcett |

OTHER PUBLICATIONS

List of IBM Patents or Patent Applications Treated as Related.

An open invitation to beta-test IBM InfoSphere Streams; Oct. 20, 2014.

Google, "node software license management by node H04l67/10," Google Search, p. 1-2, https://www.google.com/search?site=&tbm=pts&source=hp&q=node+software+license+management+by+node+H04l67%2F10&oq=node+software+license+, Accessed on Mar. 30, 2017.

Google, "node software license threshold management by node H04l67/10," Google Search, p. 1-2, https://www.google.com/search?tbm=pts&hl=en&q=node+software+license+threshold+management+by+node+H04l67%2F10, Accessed on Mar. 30, 2017.

\* cited by examiner

MANAGING STALENESS LATENCY AMONG APPLICATION BUNDLES

STATEMENT REGARDING PRIOR DISCLOSURES BY THE INVENTOR OR A JOINT INVENTOR

The following disclosures(s) are submitted under 35 U.S.C. 102(b)(1)(A): An open invitation to beta-test IBM InfoSphere Streams, Oct. 20, 2014.

BACKGROUND

This disclosure relates generally to computer systems and, more particularly, relates to stream computing. Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Aspects of the disclosure relate to efficient application bundle provisioning with respect to stream computing. Aspects may manage one or more application bundles by a local host which may be distributed with respect to an operational control host. Staleness latency of an application bundle may occur using a methodology which keeps the application bundle on a compute node longer than the application bundle is needed at the time.

Disclosed aspects include managing an application bundle for processing a stream of tuples. The stream of tuples to be processed by a plurality of processing elements operating on a set of compute nodes is received. The stream of tuples is processed on a first compute node using the application bundle. A staleness factor with respect to the application bundle is detected by the first compute node. Based on a maintenance criterion related to both the application bundle and the plurality of processing elements, the application bundle is maintained on the first compute node.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
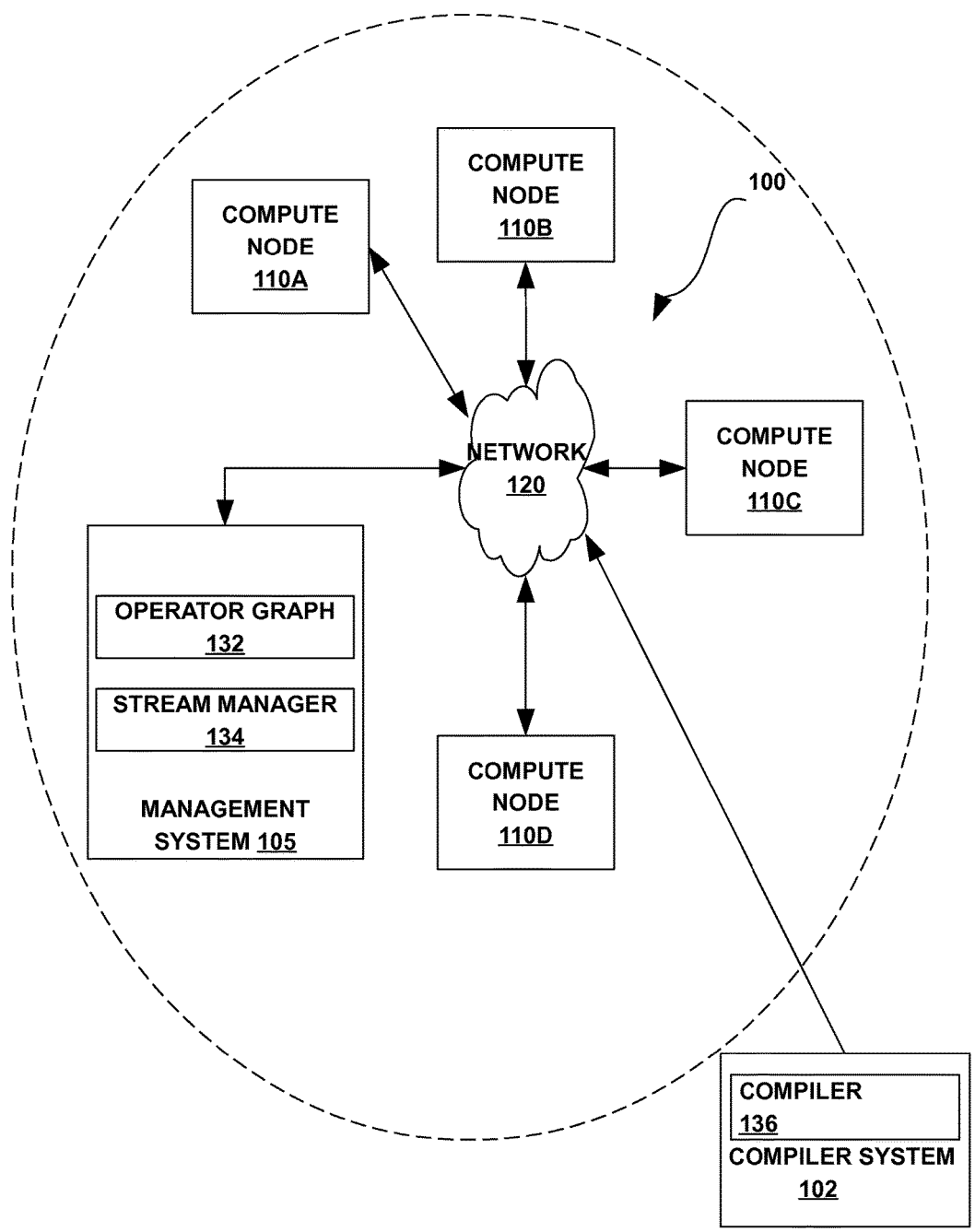
FIG. 1 illustrates a computing infrastructure configured to execute a stream computing application according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to efficient application bundle provisioning with respect to stream computing. Aspects may manage one or more application bundles by a local host which may be distributed with respect to an operational control host. Provisioning/installation of the one or more application bundles may occur using a "pull" methodology by the local host. Preloading (e.g., loading an application bundle on a compute node before the application bundle is needed) can occur in advance of receiving the stream of tuples for expected processing. Staleness latency of an application bundle may occur using a methodology which keeps the application bundle on a compute node longer than the application bundle is needed at the time. Backup of an application bundle may occur using a set of application bundle data and be based on susceptibility/vulnerability of the application bundle.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

A streams processing job has a directed graph of processing elements that send data tuples between the processing elements. The processing element operates on the incoming tuples, and produces output tuples. A processing element has an independent processing unit and runs on a host. The streams platform can be made up of a collection of hosts that are eligible for processing elements to be placed upon. When a job is submitted to the streams run-time, the platform scheduler processes the placement constraints on the processing elements, and then determines (the best) one of these candidates host for (all) the processing elements in that job, and schedules them for execution on the decided host.

In order for the processing element to be executed on the targeted host, the executable code image for the job (application bundle) may be made available on that host. Other than job submission, application bundle management may also be performed when a processing element gets moved to a new host. Typical reasons for why processing elements get moved to a new host are for load-balancing purposes, or for failover scenarios when a host goes down. If the new host does not have the application bundle available, then it can be provisioned there. Application bundles can be relatively large, so there is a measurable cost of moving application bundles between hosts and for storing them on a host.

Options for making application bundles available on relevant host(s) include downloading the application bundle as part of a processing element start-up request (e.g., startPE) and storing the application bundle (into a non-shared or shared file system). In the first methodology (downloading as part of a start-up "push"), there is only a single source point for downloads, the central control point can only exhibit limited control over the application bundle management on each host, the central control point may desire to control when to uninstall the application bundle as well, and it may be cumbersome to implement more advanced management operations (e.g., staleness detection, efficient redundancy). In the second methodology (storing into a file system), in certain systems the hosts may have to mount/manage with respect to the file system. Aspects of the disclosure may provide performance or efficiency benefits when managing one or more application bundles (e.g., speed, flexibility, responsiveness, resource usage).

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
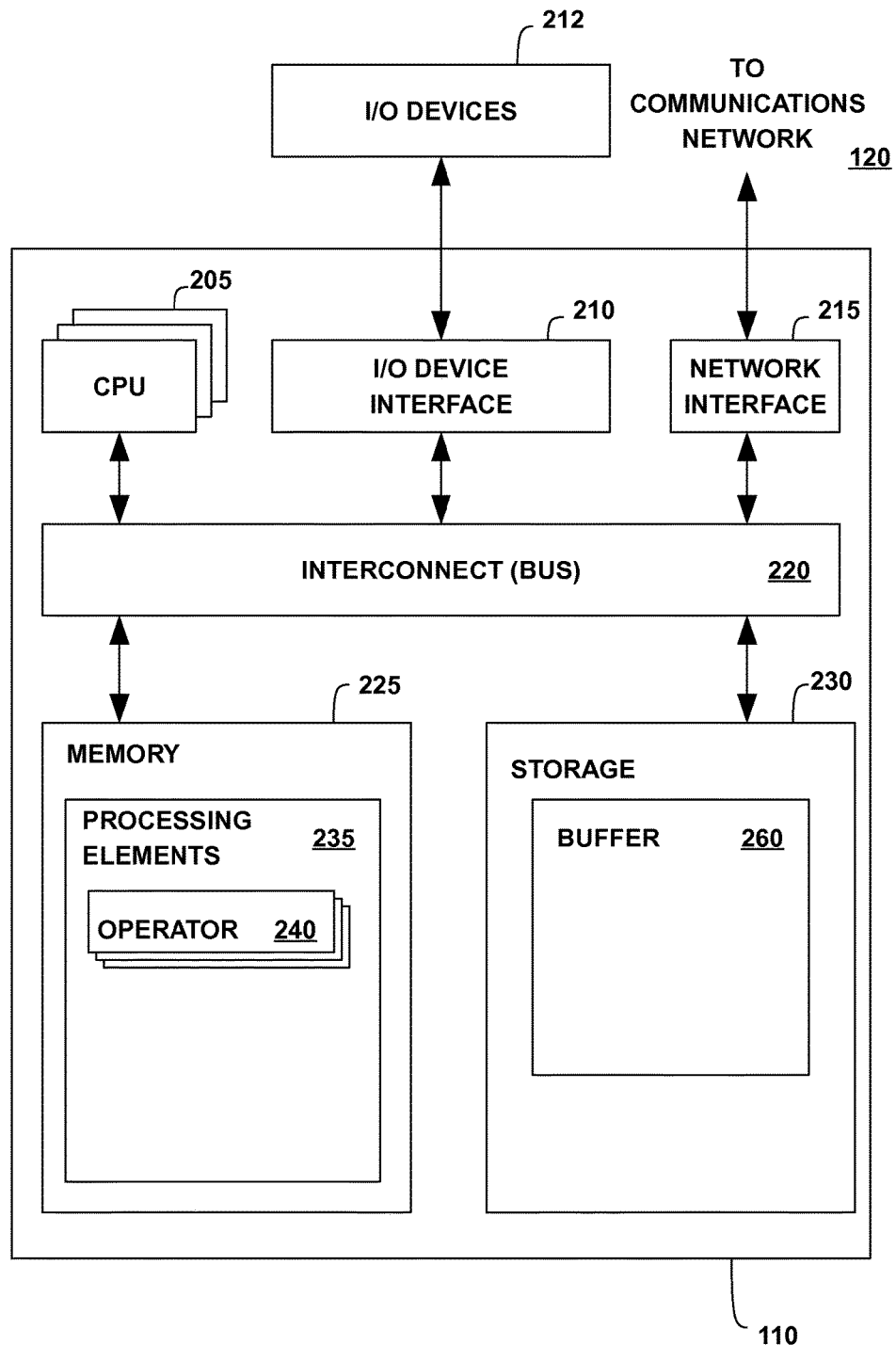
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
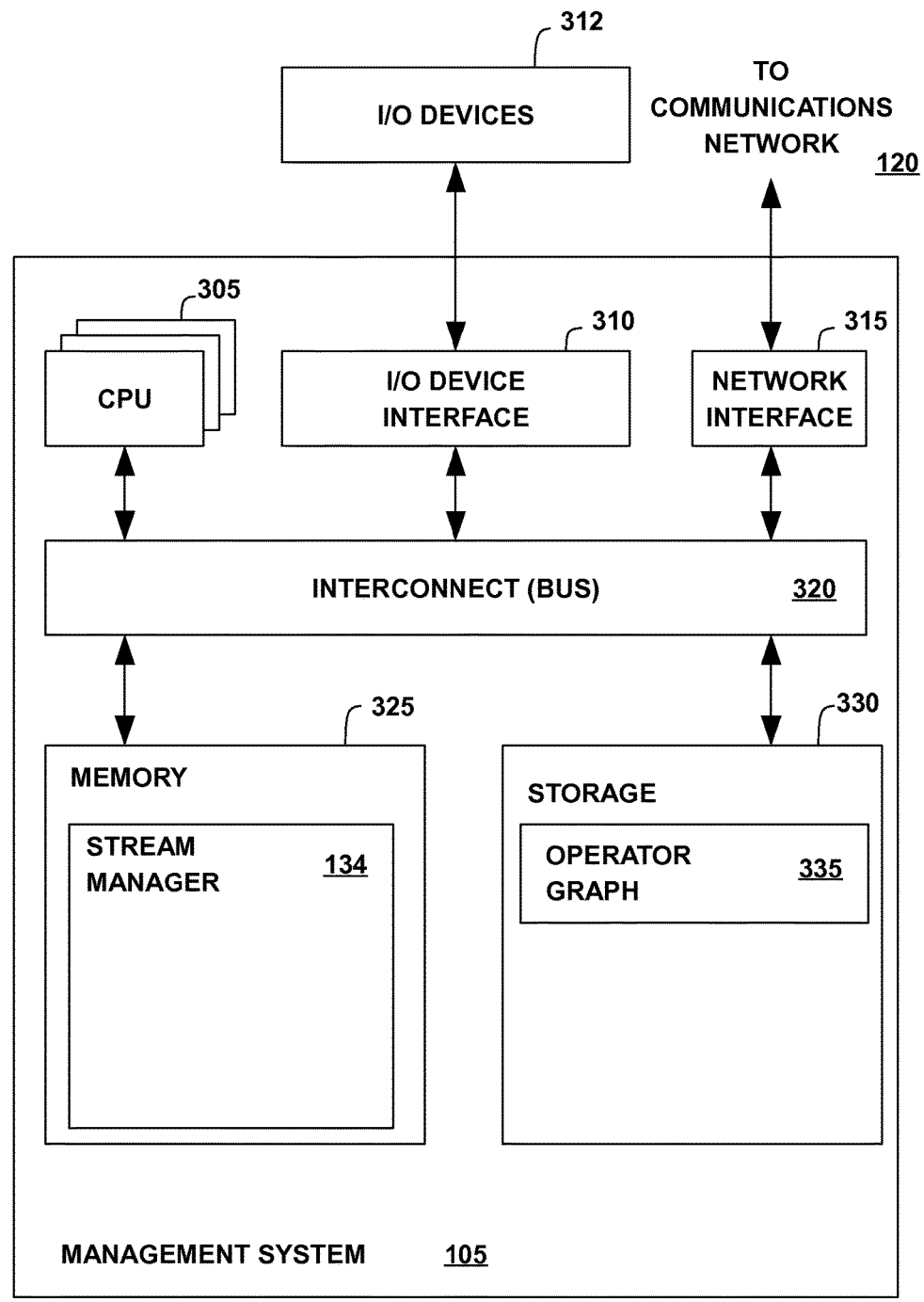
FIG. 3 illustrates a more detailed view of the management system of FIG. 1 according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
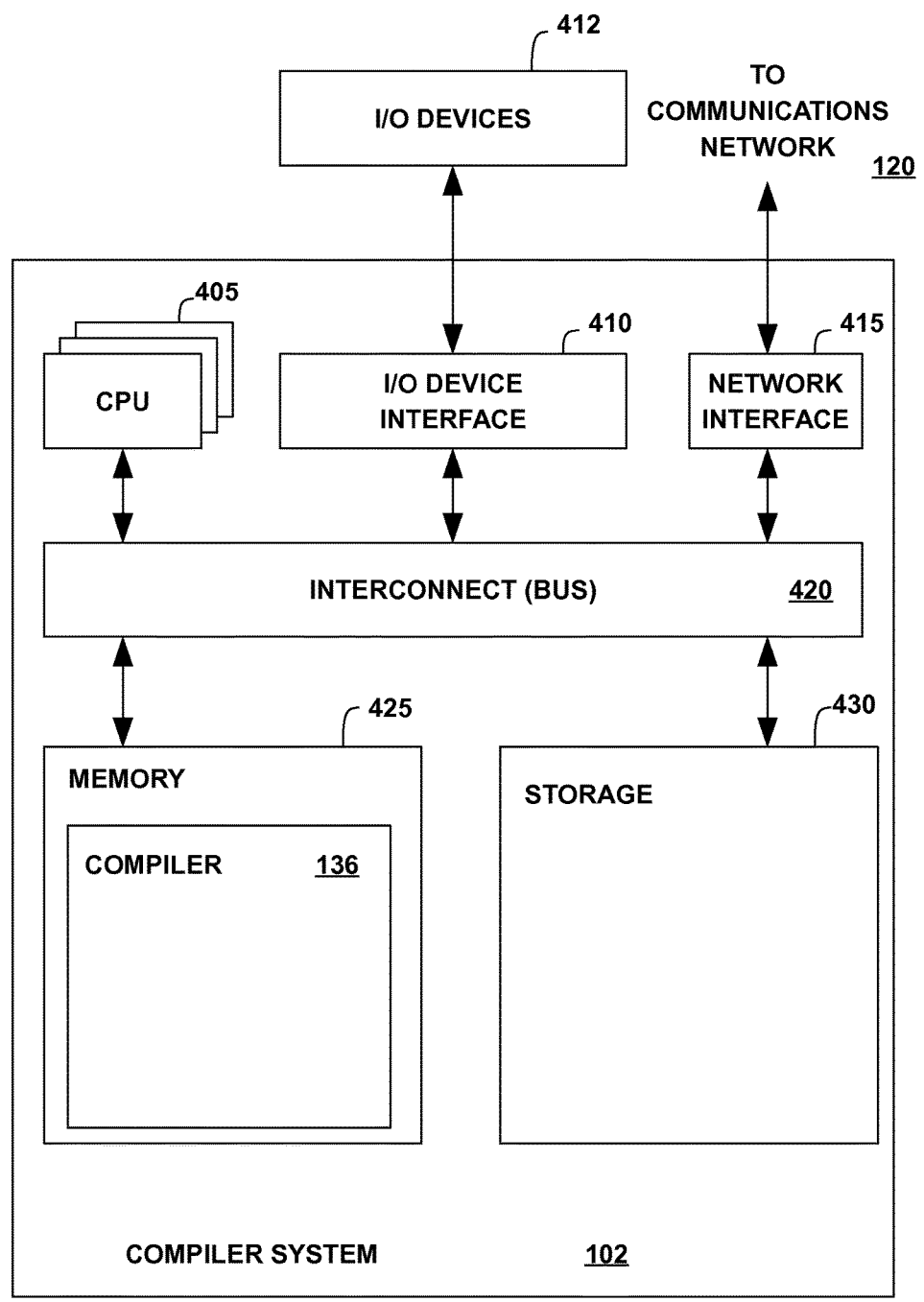
FIG. 4 illustrates a more detailed view of the compiler system of FIG. 1 according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
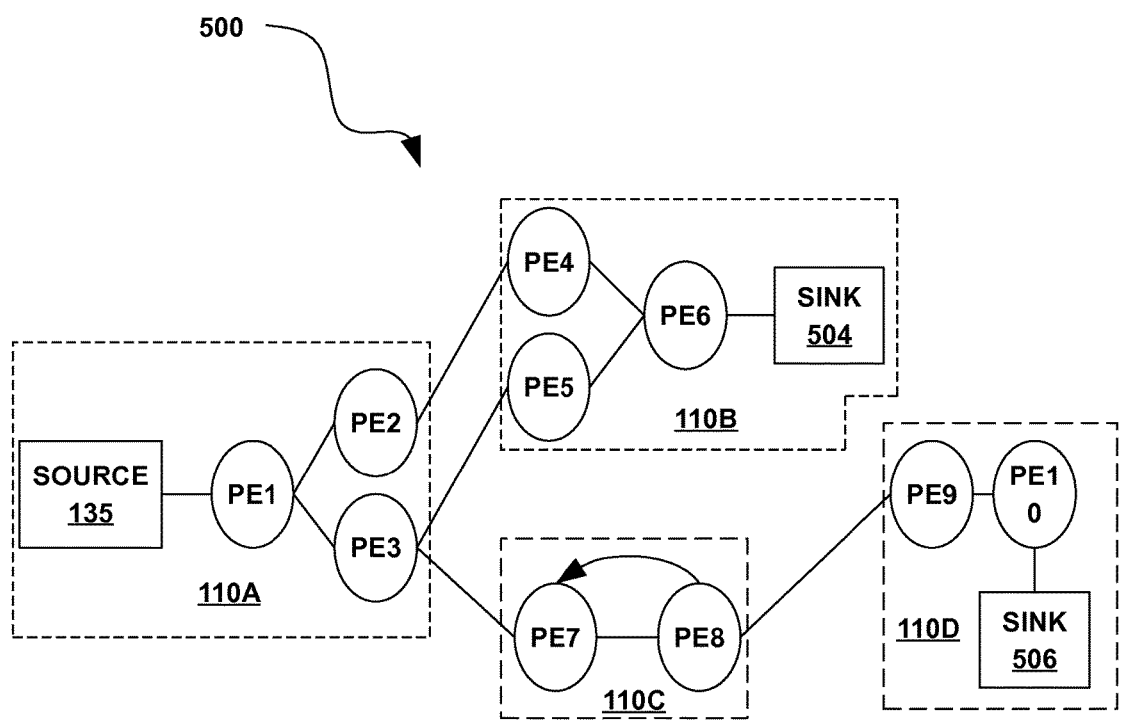
FIG. 5 illustrates an operator graph for a stream computing application according to various embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
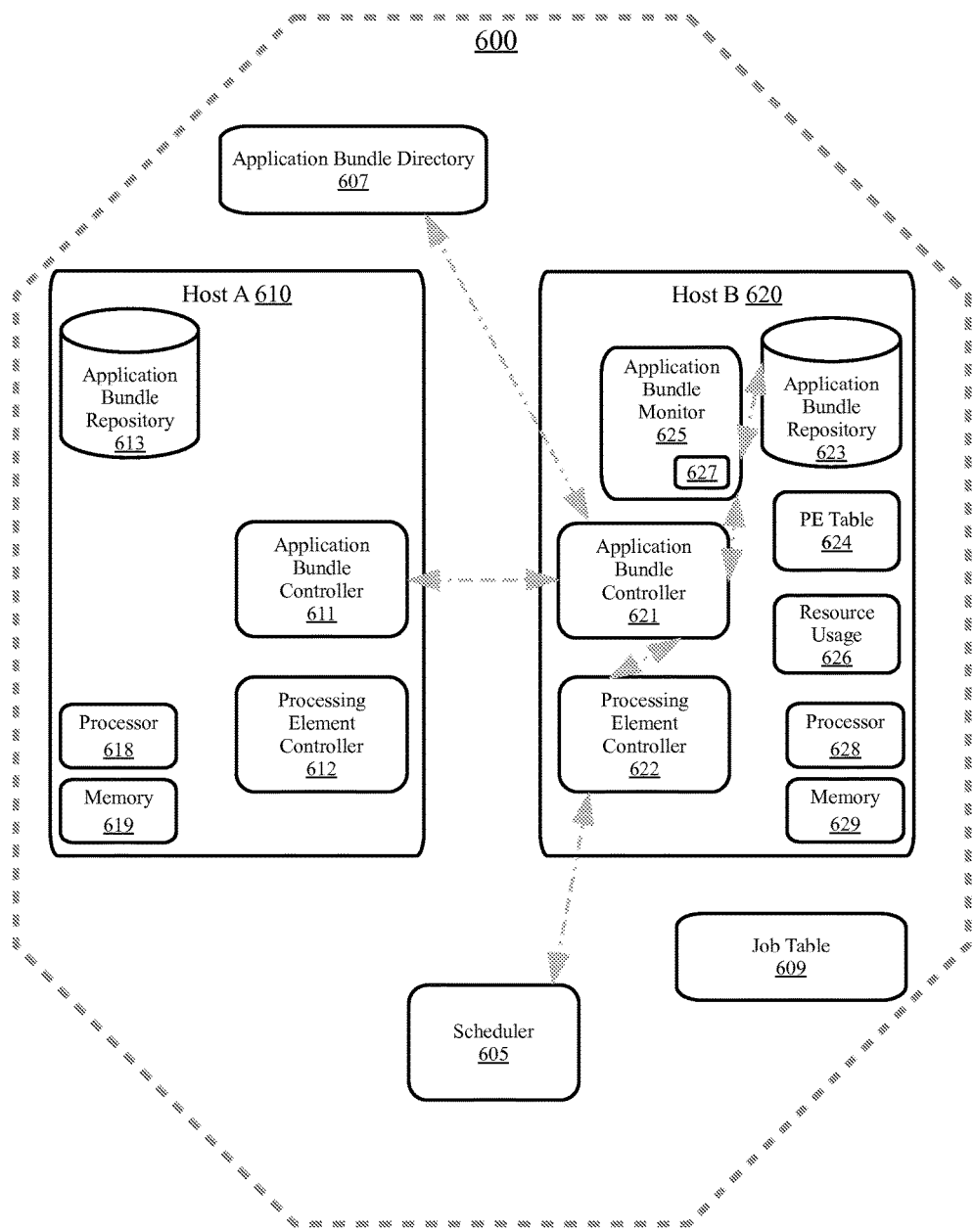
FIG. 6 shows an example system for using application bundle management with respect to executing a stream computing application according to embodiments.

FIG. 6 shows an example system 600 for using application bundle management with respect to executing a stream computing application according to embodiments. The example system 600 may illustrate a file system. The example system 600 has a Host A 610 and a Host B 620 ("hosts"). Aspects of the hosts 610, 620 may have similar or the same components with like functionality. The hosts 610, 620 may have processors 618, 628 and memory 619, 629. In embodiments, the hosts are physically separate compute nodes. In certain embodiments, virtual machines may be utilized. Lines/arrows may be depicted to show certain communications of the example system 600; however, other communications between/among components are contemplated.

In response to receiving a job (e.g., a job with an associated application bundle), a scheduler 605 (i.e., stream manager) can identify for allocation and allocate processing elements to hosts 610, 620. The scheduler 605 may monitor a stream application running on the hosts 610, 620. As such, the scheduler 605 can change the deployment of the operator graph. The scheduler 605 may, for example, move processing elements from one host to another to manage the processing loads of the hosts 610, 620 in the system 600. The scheduler 605 may communicate with computer processing element controllers 612, 622. For example, the scheduler 605 may send determine/select placement constraints on processing elements for the job, determine a candidate host for the processing elements for the job (e.g., Host B 620), and schedule the processing elements for the job for execution on the candidate host.

Computer processing element controllers 612, 622 can manage a life-cycle of one or more computer processing elements. A portion of the life-cycle includes getting the one or more processing elements started. Accordingly, the one or more computer processing elements can correspond with an executable bundle, and the executable bundle may be made available on the host (e.g., via a request to an application bundle controller to load/install the bundle). In response to the processing element controllers 612, 622 starting the one or more computer processing elements, the one or more computer processing elements are active for processing of tuples that flow through. so there is really no assignments of tasks to the PEs from the PEC.

Application bundle controllers 621, 611 manage a set of application bundles. For instance, the set of application bundles may be included in a file system which has individual hosts performing mounting/management (e.g., by the application bundle controllers 621, 611). In order for a particular processing element to be executed on a particular host, an application bundle (e.g., executable code image for the job) may be available/installed with respect to the particular host. Application bundle controllers 621, 611 may be involved in provisioning the particular application bundle (e.g., communicate with each other). For example, the particular application may be desired when a job is submitted. In embodiments, processing elements may be moved from one host to another (e.g., Host B 620 to Host A 610) for reasons such as load-balancing or failover circumstances. As such, the new host (e.g., Host A 610) may get/retrieve/pull the application bundle. Moving application bundles (which can include file sizes such 0.5 gigabytes) can have a measurable cost (a variety of sizes may have a measurable cost and can be covered by embodiments). Aspects of an application bundle controller 621/611 may have performance or efficiency benefits by operating local to a host 620/610. Local information may be leveraged (e.g., databases on the local host having worthwhile information may be utilized). Management may occur proactively (e.g., instead of in a reactive manner).

In response to receiving a "get application bundle request" (e.g., from computer processing element controller 622), the application bundle controller 621 can query/check an application bundle directory 607 (e.g., which can be global to all hosts within the example system 600) to ascertain where the current locations are for the application bundle (e.g., a set of candidate application bundle sources). For example, application bundle directory 607 may indicate that both Host A 610 and Host C (not shown) have a first application bundle and may indicate that Host B 620 has a second application bundle (e.g., lists which hosts currently have which application bundles installed on it). Using the set of candidate application bundle sources, the application bundle controller 621 may determine/select a specific source with which to initiate retrieval/download/installation (e.g., provision management). The determination/selection can be based on a variety of factors such as host proximity (e.g., network-wise nearness) with expected transfer rates above a threshold, round-robin distribution for spreading, random selection, etc.

An application bundle monitor 625 thread can (periodically) make adjustments as to which application bundles that are not being utilized at a temporal point (e.g., not required currently) by a running processing element may get installed/un-installed on Host B 620 (e.g., the host it resides on and is monitoring). In embodiments, one application bundle monitor thread runs on each host and makes decisions/determinations on its own set of policies (e.g., policy choices are made separately for each host). For example, the application bundle monitor 625 determines policies 627 for Host B 620. Similarly, the application bundle monitor 625 can monitor/determine/impact/select resource usage 626 (e.g., file space=80%: CPU=24%) using, for example, threshold values. Also, the application bundle monitor 625 can observe/track relationships (e.g., status, configuration) of processing elements and application bundles using a processing element table 624 (e.g., a first processing element using a specific application bundle, a second processing element using the specific application bundle). The processing element table 624 may be local to each host and can list which processing elements are currently running on its host along with which application bundle it references.

A job table 609 can record for observation/tracking (e.g., status, configuration) of application bundles and hosts (e.g., a first application bundle on Host A 610 and Host B 620: a second application bundle on Host A 610 and Host C (not shown)). Candidates to host processing elements for a particular job may be identified/listed in the job table 609 (e.g., which can be global to all hosts within the example system 600 and may be indexed by application bundle). Application bundle repositories 613, 623 can store one or more application bundles (and be tracked/monitored/observed in ways described herein). Other configurations and arrangements are contemplated. Consider the following illustrative operation flow when managing application bundle(s) using the example system 600.

To begin, a submission may be received. The submission may include a job, and be related to a set of processing elements and associated with an application bundle. Using the scheduler 605, a runtime determination is made for assignment of the set of processing elements to a set of hosts (e.g., Host A 610, Host B 620). The scheduler 605 can then transmit/send a request (e.g., to computer processing element controller 622) having a (remote) execute start processing element command for a particular processing element on a particular host (e.g., PE1 on Host B 620).

Processing element start-up (e.g., by the computer processing element controller 622) may work with a local application bundle controller (e.g., application bundle controller 621) to determine if the application bundle is installed on the local host (e.g., Host B 620). If it is determined that the application bundle is not installed on the local host, then the local application bundle controller (e.g., 621) queries the application bundle directory (e.g., 607) for candidate hosts. A particular candidate host (e.g., 610) may be identified. The local application bundle controller (e.g., 621) can then pull the application bundle from the particular candidate host (e.g., 610). At least one of communicating, pulling, downloading, or installing may occur utilizing the application bundle controllers 611, 621.

In response to the local application bundle controller (e.g., 621) pulling the application bundle, processing element start-up/initiation/execution may be continued. Application bundle controllers (e.g., 611, 621) can manage operations (e.g., preloading, staleness latency, backup) on individual respective hosts when processing the job. Accordingly, aspects of example system 600 may provide performance or efficiency benefits (e.g., speed, flexibility, responsiveness, resource usage) when managing a code load (e.g., moving executable code between hosts) using a middle/local layer of application program management.

Figure 7:
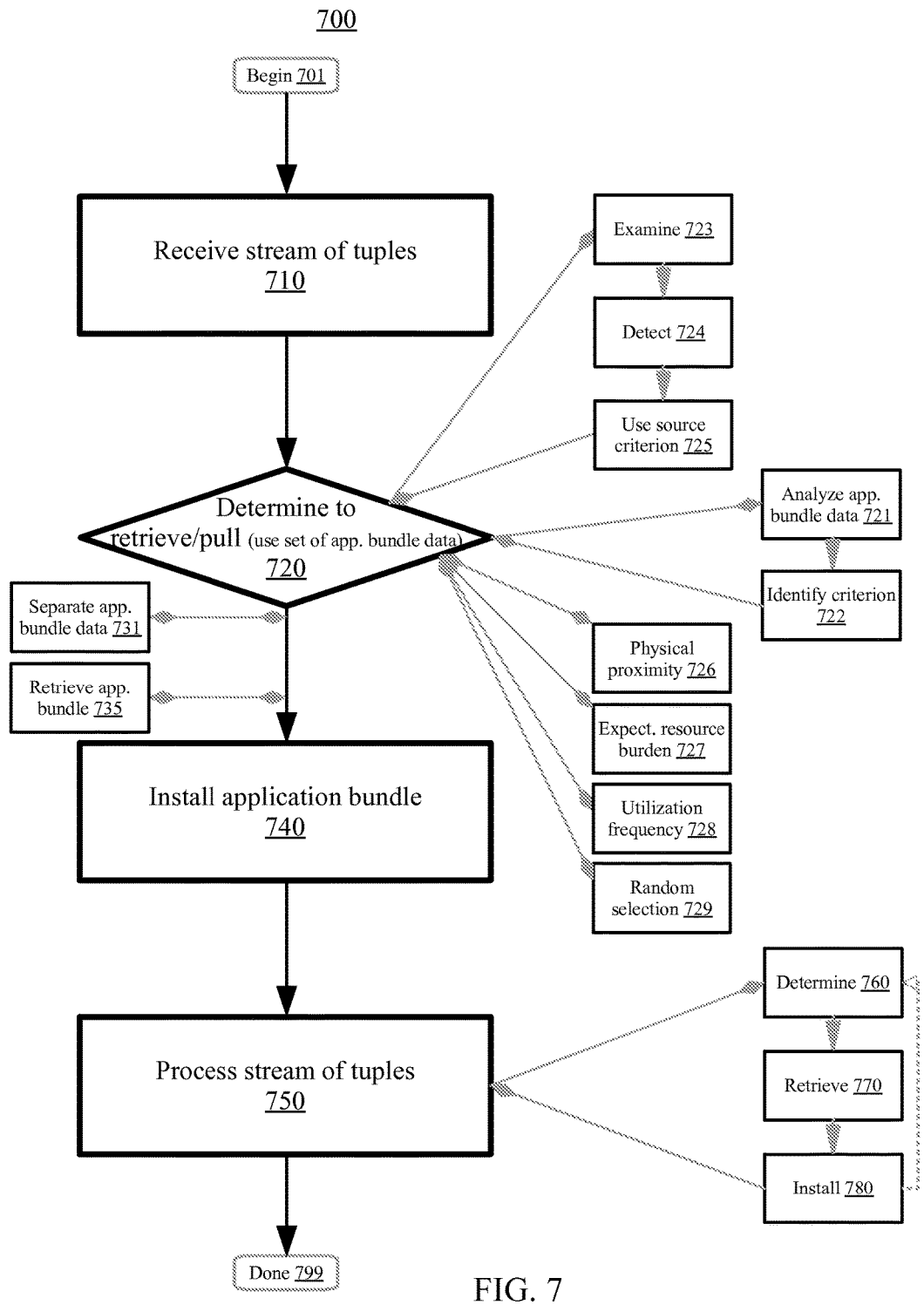
FIG. 7 is a flowchart illustrating a method for processing a stream of tuples using an application bundle according to embodiments.

FIG. 7 is a flowchart illustrating a method 700 for processing a stream of tuples using an application bundle according to embodiments. Aspects can manage application bundle(s) (in a file system) by a local host which is distributed/separate from a central control host or a remote host that execution is intended for with respect to the application bundle(s). Provisioning/installation of application bundle(s) may occur using a "pull" methodology. Method 700 may begin at block 701.

At block 710, a stream of tuples is received. The stream of tuples is to be processed by a plurality of processing elements operating on a set of compute nodes. The stream of tuples may be received consistent with the description herein including FIGS. 1-6. Current/future processing by the plurality of processing elements may be performed consistent with the description herein including FIGS. 1-6. The set of compute nodes may include a shared pool of configurable computing resources. For example, the set of compute nodes can be a public cloud environment, a private cloud environment, or a hybrid cloud environment. In certain embodiments, each of the set of compute nodes are physically separate from one another.

At block 720, a determination is made to retrieve the application bundle from a second compute node. The determination is made by a first compute node based on a set of application bundle data. The set of application bundle data can include which nodes/hosts (currently) have which application bundle(s). For instance, a multi-dimensional array may include a first column listing entries for application bundles (e.g., AB1, AB2, AB3) and a second column listing entries for compute nodes (e.g., HostA+HostC, HostB, HostA+HostB+HostC). Entries in the same row of the multi-dimensional array can correlate application bundles with compute nodes (e.g., AB1 is on Host A and Host C, AB2 is on Host B, AB3 is on each of the three example hosts). Other data structures/orientations are considered, the multi-dimensional array is presented as illustrative.

In embodiments, the set of application bundle data may be stored separate from both the first compute node and the second compute node (see block 731). The set of application bundle data may be globally available to (all) nodes/hosts. In various example embodiments, the set of application bundle data may be available via a pull model, a fetch/retrive model, a publish/subscribe model, or a push model. As such, an application bundle controller may have a connection with an application bundle directory for retrieval of candidate locations of a specific application bundle. In embodiments, the determination can include an analyzing operation or an identification operation.

In embodiments, the set of application bundle data is analyzed at block 721. For instance, analyzing can include examining (e.g., performing an inspection of host/bundle-data), evaluating (e.g., generating an appraisal of host/bundle-data), resolving (e.g., ascertaining an observation/conclusion/answer with respect to host/bundle-data), parsing (e.g., deciphering a construct for the host/bundle-data), querying (e.g., asking a question regarding host/bundle-data), or categorizing (e.g., organizing by a feature of the host/bundle-data). Data analysis may include a process of inspecting, cleaning, transforming, or modeling data to discover useful information, suggest conclusions, or support decisions. Data analysis can extract information/patterns from a data set and transform/translate it into an understandable structure for further use. A criterion can be identified at block 722. The criterion may be identified in response to and based on the analysis at block 721. The criterion can indicate to retrieve the application bundle from the second compute node. The criterion may be related to a variety of factors discussed herein. For instance, the criterion may correlate with an advantageous/favorable source (e.g., provides overall performance or efficiency benefits for the system by sourcing from a more favorable source rather than a less favorable source).

In certain embodiments, the set of application bundle data is examined for the application bundle at block 723. For example, an inspection of the set of application bundle data occurs to find a listing of nodes having the application bundle. It may be detected at block 724 that the second compute node has the application bundle. For example, the application bundle data can indicate possession/holding/keeping/running of the application bundle by one or more compute nodes including the second compute node. Using (e.g., based on by analyzing) at least one source criterion, it can be determined at block 725 to retrieve the application bundle from the second compute node.

In embodiments, determining to retrieve the application bundle from the second compute node can include using at least one source criterion (e.g., basis, benchmark, factor, measure, point of comparison, rule for sourcing). The at least one source criterion can include at least one of a physical proximity criterion, an expected resource burden criterion, a utilization frequency criterion, or a random selection criterion. At block 726, a physical proximity criterion of the second compute node with respect to the first compute node may be used. For example, nearness may be measured with respect to geographic location which may indicate positive impacts on performance/efficiency bandwidth or speed when compared with another node. At block 727, an expected resource burden criterion when downloading the application bundle to the first compute node from the second compute node can be used. For instance, processing or memory usage may be different depending on which compute nodes are used for reasons such as compatibility or activity. At block 728, a utilization frequency criterion of the second compute node may be used. For example, a count of how often the second compute node is used for processing may be recorded so that resources/assets may be distributed without causing an undue burden on nodes which perform the processing or so as to assist those nodes perform the processing. At block 729, a random selection criterion of the second compute node can be used. For instance, randomly choosing a source node can efficiently distribute burdens or have security benefits. In certain embodiments, a round-robin methodology or a combination of the various criteria may be used.

In embodiments, the application bundle is retrieved at block 735. The application bundle may be retrieved by the first compute node (e.g., pulled by the first compute node from the second compute node). The application bundle may be retrieved in response to determining to retrieve the application bundle from the second compute node. Retrieving the application bundle may include copying or moving the application bundle. Retrieving the application bundle can include at least one of transmitting a request for the application bundle, obtaining the application bundle, or receiving the application bundle. In certain embodiments, retrieving can include selectively retrieving chosen elements of the application bundle to subsequently generate a like version of the application bundle by a piecemeal methodology.

At block 740, the application bundle is installed on the first compute node. The first compute node manages the installation. Using the first compute node to manage the installation can facilitate the pull methodology. In embodiments, managing the installation can include, for example, retrieval aspects (see block 735). Installing may include initiation/commencement of a deployment/placement/installation/allocation. Installing the application bundle may include creating a local copy/version of the application bundle on the first compute node. Installing the application bundle can generate a like version of the application bundle by a piecemeal methodology (e.g., fit together various components). Installation can have a verification phase which verifies operability or completeness. Installation may include unwrapping a wrapped data packet (e.g., which has encryption technology for security/transmission purposes).

At block 750, the stream of tuples is processed. The stream of tuples is processed using the application bundle on the first compute node. The stream of tuples may be processed consistent with the description herein including FIGS. 1-6. The application bundle, having been pulled onto the first compute node, can process the stream of tuples without involvement from another compute node. Processing, using local management on the first compute node, of the stream of tuples may provide various flexibilities for the set of compute nodes. Overall flow (e.g., data flow) may be positively impacted by having the application bundle on the first compute node.

In embodiments, the set of application bundle data is updated to include that the first compute node has the application bundle at block 760. For example, the first compute node can transmit a status notification for editing of the set of application bundle data. In embodiments, a determination is made (by a third compute node based on the set of application bundle data) to retrieve the application bundle from the first compute node at block 770. In response, the application bundle can be retrieved by the third compute node. The application bundle may be installed on the third compute node (by the third compute node) at block 780. As such, the first compute node can now be utilized just as the second compute node was previously. Therefore, pulling can permit parallelization of application bundle flow, download, or installation.

The methodology may provide an exponential-type benefit. To illustrate, a pull download can be performed in parallel between multiple source and destination hosts. As hosts get the application bundle installed, they then become available for a candidate source for a next application bundle download. So, a number of candidate sources for download requests increases. For example, if a job gets submitted to 8 hosts (A, B, C, D, E, F, G, H), an example of a possible bundle flow includes: 1) installed onto A; 2) B pulls from A; 3) C pulls from A and D pulls from B; 4) E pulls from A, F pulls from B, G pulls from C, and H pulls from D. This illustrative 4-phase flow to 8 hosts may provide performance or efficiency benefits with respect to, for example, an 8-operation flow using a central control point to push the application bundle to each of the 8 hosts individually.

Method 700 concludes at block 799. Aspects of method 700 may provide performance or efficiency benefits for processing a stream of tuples using an application bundle. For example, aspects of method 700 may include positive impacts on resource usage using a pull operation with respect to a particular application bundle in a file system. Altogether, performance or efficiency benefits when managing application bundle(s) may occur (e.g., speed, flexibility, responsiveness, resource usage).

Figure 8:
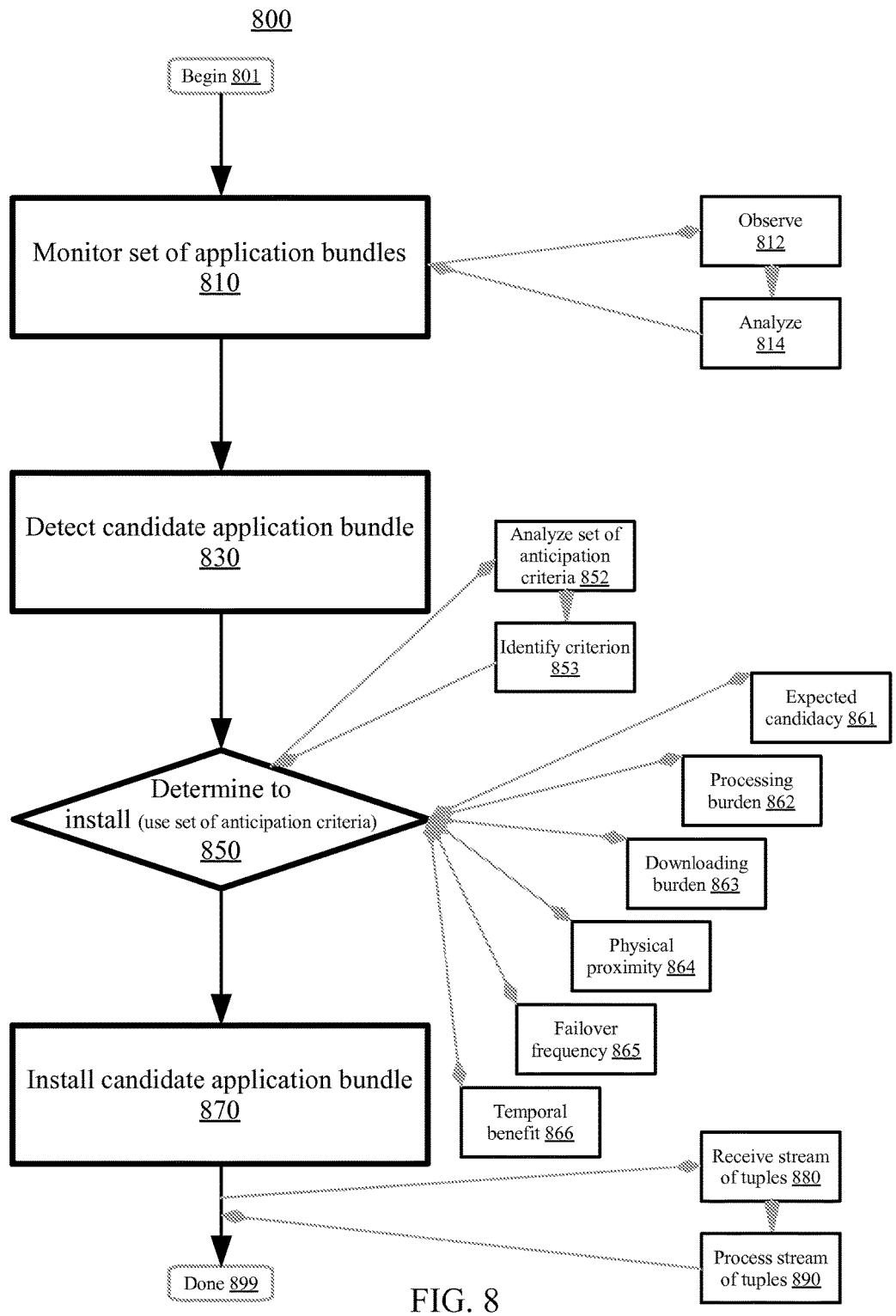
FIG. 8 is a flowchart illustrating a method for managing a set of application bundles for processing a stream of tuples according to embodiments.

FIG. 8 is a flowchart illustrating a method 800 for managing a set of application bundles for processing a stream of tuples according to embodiments. Aspects can manage application bundle(s) (in a file system) by a local host which is distributed/separate from a central control host or a remote host that execution is intended for with respect to the application bundle(s). Preloading of application bundle(s) may occur using a push or a pull methodology. Preloading can occur in-advance-of/separate-from receiving the stream of tuples. Aspects may load/place an application bundle on a compute node before the application bundle is needed (for use). Preloading may be based on expected processing of the stream of tuples. Method 800 may begin at block 801.

At block 810, a first compute node monitors the set of application bundles which are installed on a second compute node. For example, the first compute node may directly communicate with the second compute node to perform the monitoring. Alternatively, the first compute node may communicate with an application bundle directory (e.g., set of application bundle data) which is stored separate from the second compute node. In embodiments, monitoring the set of application bundles may include observing the set of application bundles at block 812. Also, monitoring the set of application bundles can include analyzing the set of application bundles at block 814. In certain embodiments, observing and analyzing can include aspects which receive an element and process the element that was received.

For instance, observing (at block 812) can include querying (e.g., asking a question), searching (e.g., exploring for a reason), obtaining (e.g., recording a collection), probing (e.g., checking a property), scanning (e.g., reviewing a sample), or tracking (e.g., following a characteristic). To illustrate, observing may include locating a group of specialized application bundles which can interpret the particularized subset of information to be found in tuples expected to be received for processing within a quickly-approaching temporal period.

For instance, analyzing (at block 814) can include extracting (e.g., creating a derivation), examining (e.g., performing an inspection), dissecting (e.g., scrutinizing an attribute), parsing (e.g., deciphering a construct), comparing (e.g., relating an assessment), or classifying (e.g., assigning a designation). Data analysis may include a process of inspecting, cleaning, transforming, or modeling data to discover useful information, suggest conclusions, or support decisions. Data analysis can extract information/patterns from a data set and transform/translate it into an understandable structure (e.g., a data report which can be provided) for further use.

At block 830, the first compute node detects that the set of application bundles includes a candidate application bundle. Detecting the set of application bundles includes the candidate application bundle can include sensing the set of application bundles includes the candidate application bundle. To illustrate, sensing can include identifying one (or more) candidate application bundle(s) of the group of specialized application bundles to interpret the particularized subset of information to be found in tuples expected to be received for processing within the quickly-approaching temporal period (e.g., the next minute). In certain illustrative embodiments, detection can include an identification of a measurable change/modification in, for example, an attribute related to the candidate application bundle (e.g., a quantitative representation of a ratio between a count of available candidate application bundles and a count of the set of application bundles).

At block 850, it is determined to install the candidate application bundle on the first compute node. Such determination is made by the first compute node based on a set of anticipation criteria. The determination can include determining to utilize the first compute node to manage the installation by facilitating a pull methodology. In embodiments, managing the installation can include, for example, retrieval aspects. In various embodiments, a push methodology (e.g., from the second compute node via management external to the first compute node) may be determined to be utilized. Determining to install the candidate application bundle may include determining a plan for initiation/commencement of a deployment/placement/installation/allocation. The set of anticipation criteria can have various factors, elements, or characteristics with respect to certain foundations/grounds for installation of the candidate application bundle.

In embodiments, the determination can include analyzing the set of anticipation criteria at block 852. Accordingly, the determination may identify a criterion at block 853. For instance, analyzing the set of anticipation criteria (at block 852) and identifying the criterion (at block 853) can include extracting (e.g., creating a derivation), examining (e.g., performing an inspection), evaluating (e.g., generating an appraisal), dissecting (e.g., scrutinizing an attribute), resolving (e.g., ascertaining an observation/conclusion/answer), parsing (e.g., deciphering a construct), querying (e.g., asking a question), searching (e.g., exploring for a reason), comparing (e.g., relating an assessment), classifying (e.g., assigning a designation), or categorizing (e.g., organizing by a feature). Anticipation criteria analysis may include a process of inspecting, cleaning, transforming, or modeling data to discover useful information, suggest conclusions, or support decisions. Anticipation criteria analysis can extract information/patterns from a data set and transform/translate it into an understandable structure (e.g., a data report which can be provided) for further use. The identified criterion can indicate to install the candidate application bundle on the first compute node.

In embodiments, the set of anticipation criteria includes an expected candidacy criterion of the first compute node for processing the stream of tuples at block 861. The expected candidacy criterion of the first compute node for processing the stream of tuples can be related to a likelihood that the first compute node will be requested/utilized/needed to process the stream of tuples. For example, if the system is deluged with a torrent of streams of tuple, the likelihood may increase. On the other hand, if an overall system load is decreasing the likelihood may decrease. Thus, an indication that the likelihood will increase (e.g., a new job is submitted) can influence preloading. As another example, in response to the first compute node completing an earlier job, availability may indicate a proper scenario to preload because the first compute node can have more availability than other similarly-situated compute nodes.

In embodiments, the set of anticipation criteria includes an expected resource burden criterion when processing the stream of tuples at block 862. The expected resource burden criterion when processing the stream of tuples can be related to resource usage (e.g., processing speed/power, memory levels) which is expected during processing/computation. The expected resource burden criterion can correspond to a forecast/predicted value based on examples such as historical information, information with respect to the job/bundles, or other information. For instance, if the first compute node tends to burden resources less than other compute nodes when processing jobs that use a particular type of application bundle, the first compute node may be identified/chosen for processing which utilizes the particular type of application bundle. As such, preloading may be of benefit in a manner which is consistent with a plurality of anticipation criteria (e.g., expected candidacy criterion and expected resource burden criterion).

In embodiments, the set of anticipation criteria includes an expected resource burden criterion when downloading the application bundle to the first compute node from the second compute node at block 863. The expected resource burden criterion when downloading the application bundle to the first compute node from the second compute node can be related to resource usage (e.g., processing speed/power, memory levels) which is expected to be expended for downloading/installation/deployment/allocation. The expected resource burden criterion can correspond to a forecast/predicted value based on examples such as historical information, information with respect to the job/bundles, or other information. For instance, if the first compute node tends to burden resources less than other compute nodes when downloading a particular type of application bundle, the first compute node may be identified/chosen for downloading which utilizes the particular type of application bundle. As another example, bandwidth available (or historically conveyed) may indicate that a connection between the first and second compute nodes would have less of a burden on the overall system than another combination of compute nodes.

In embodiments, the set of anticipation criteria includes a physical proximity criterion of the second compute node with respect to the first compute node at block 864. The physical proximity criterion can be based on, for example, relative geographical nearness. Weighting of the physical proximity criterion (e.g., weighting with respect to other criteria) may be different for private cloud environments, public cloud environments, or hybrid cloud environments. For example, the physical proximity criterion may be weighted with less importance in a private cloud environment with storage all within one physical structure/building as opposed to greater weighting in a public cloud environment with storage across multiple servers deployed across a continent. As such, in general, nearer compute nodes may be used; however, certain circumstances in a hybrid cloud environment, for example, could be conducive to larger distances (e.g., for the purposes of keeping the application on either the public cloud or the private cloud without using both).

In embodiments, the set of anticipation criteria includes a failover frequency criterion of the second compute node at block 865. The failover frequency criterion of the second compute node may indicate how often the second compute nodes fails and would utilize a preloaded compute node for processing the job in response to such failure. The failover frequency criterion may correlate to an expectation/need for a fast processing element restart. The expectation/need can be scored/tiered with respect to an established/predetermined threshold. In embodiments, communication may be opened with a job table to anticipate potential job/processing element movement/shifting. A variety of benchmarks or thresholds may be used in combination with other criteria which, altogether, utilize the failover frequency criterion.

In embodiments, the set of anticipation criteria includes a temporal benefit criterion for processing the stream of tuples within a threshold temporal period at block 866. The temporal benefit criterion for processing the stream of tuples within the threshold temporal period can indicate a proficiency of an efficiency for timeliness with respect to processing the stream of tuples. For example, if a job requests for processing of the stream of tuples to be completed within ten minutes (e.g., in order to move to the next phase of processing on-schedule), the temporal benefit criterion can indicate how often/frequent (e.g., based on a historic expectation) processing will be completed in-time (e.g., so as to facilitate staying on-schedule). Preloading using the temporal benefit criterion can assist in completing tasks on-schedule or ahead-of-schedule which may provide a measurable benefit (e.g., in cost savings or marketable positive impacts). Altogether, the set of anticipation criteria can be used interchangeably in combination with a variety of weighting methodologies being contemplated to provide one or more permutations for preloading.

At block 870, the candidate application bundle is installed on the first compute node. In various embodiments, installation may include the first compute node "pulling" the application bundle from the second compute node. In certain embodiments, installation can include the second compute node "pushing" the application bundle to the first compute node. Installing the application bundle may include creating a local copy/version of the application bundle on the first compute node. Installing the application bundle can generate a like version of the application bundle by a piecemeal methodology (e.g., fit together various components). Installation can have a verification phase which verifies operability or completeness. Installation may include unwrapping a wrapped data packet (e.g., which has encryption technology for security/transmission purposes).

In embodiments, the stream of tuples to be processed by a plurality of processing elements operating on a set of compute nodes can be received at block 880. The stream of tuples may be received consistent with the description herein including FIGS. 1-6. Current/future processing by the plurality of processing elements may be performed consistent with the description herein including FIGS. 1-6. The set of compute nodes may include a shared pool of configurable computing resources. For example, the set of compute nodes can be a public cloud environment, a private cloud environment, or a hybrid cloud environment. In certain embodiments, each of the set of compute nodes are physically separate from one another.

In embodiments, using the candidate application bundle on the first compute node, the stream of tuples may be processed at block 890. The stream of tuples may be processed subsequent to/in response to installing the candidate application bundle on the first compute node (see block 870). As such, the candidate application bundle can be preloaded with respect to processing the stream of tuples (e.g., temporally distinct by a threshold temporal period). The application bundle, having been preloaded onto the first compute node, can process the stream of tuples without a temporal lag (e.g., due to waiting for the application bundle to be downloaded). The stream of tuples may be processed consistent with the description herein including FIGS. 1-6. Processing, using local management on the first compute node, of the stream of tuples may provide various flexibilities for the set of compute nodes.

Method 800 concludes at block 899. Aspects of method 800 may provide performance or efficiency benefits for managing a set of application bundles for processing a stream of tuples. For example, aspects of method 800 may include positive impacts with respect to speed or responsiveness by preloading a particular application bundle in a file system. Altogether, performance or efficiency benefits when managing a set of application bundles may occur (e.g., speed, flexibility, responsiveness, resource usage).

Figure 9:
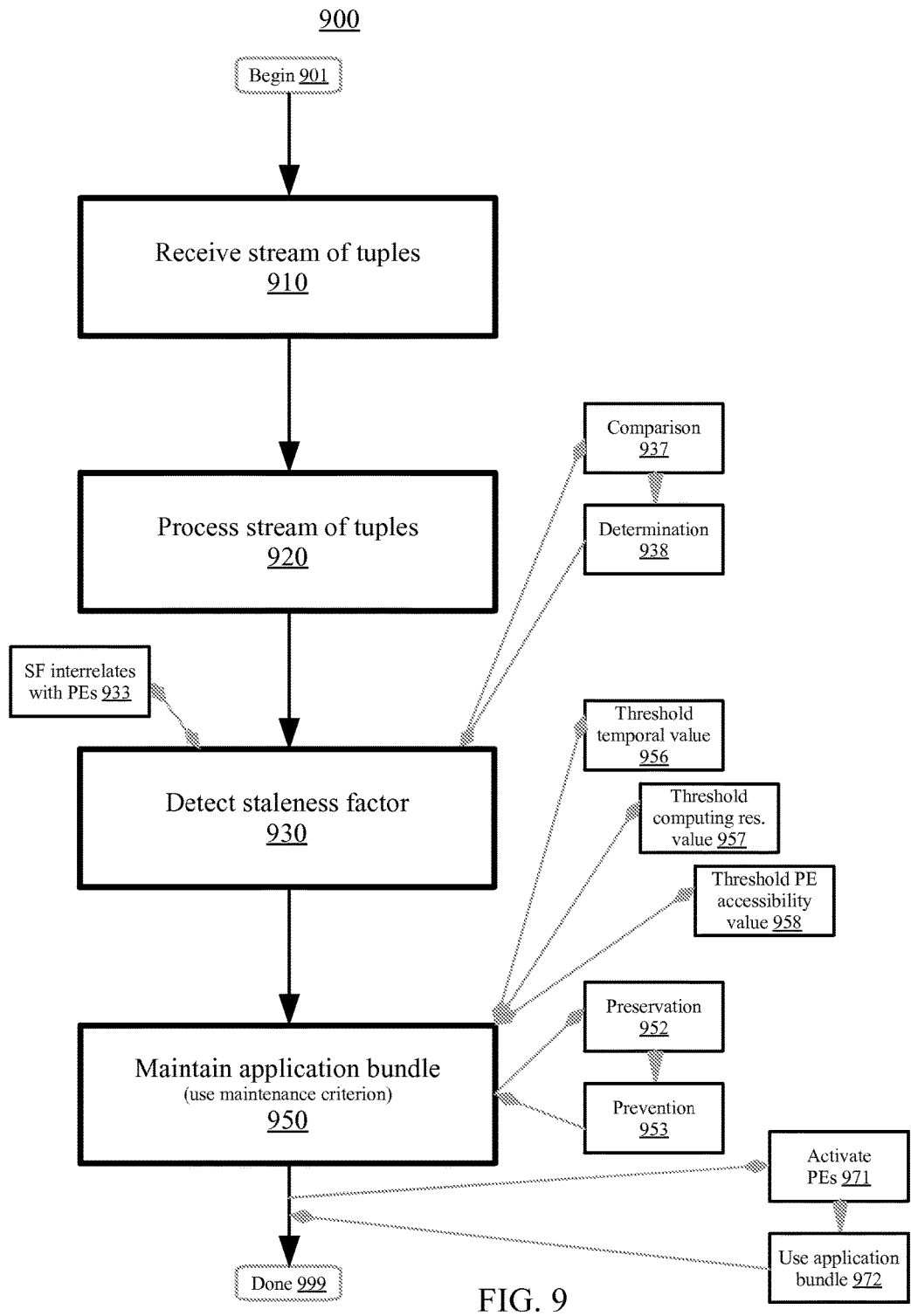
FIG. 9 is a flowchart illustrating a method for managing an application bundle for processing a stream of tuples according to embodiments.

FIG. 9 is a flowchart illustrating a method 900 for managing an application bundle for processing a stream of tuples according to embodiments. Aspects can manage application bundle(s) (in a file system) by a local host which is distributed/separate from a central control host or a remote host that execution is intended for with respect to the application bundle(s). Staleness latency of application bundle(s) may occur using a methodology which leaves/keeps application bundle(s) on a compute node longer than the application bundle is (initially) needed. Aspects may allow for quick response (e.g., when requested for utilization) due to a relative lack of lag time to provision the application bundle(s). Method 900 may begin at block 901.

At block 910, a stream of tuples is received. The stream of tuples is to be processed by a plurality of processing elements operating on a set of compute nodes. The stream of tuples may be received consistent with the description herein including FIGS. 1-6. Current/future processing by the plurality of processing elements may be performed consistent with the description herein including FIGS. 1-6. The set of compute nodes may include a shared pool of configurable computing resources. For example, the set of compute nodes can be a public cloud environment, a private cloud environment, or a hybrid cloud environment. In certain embodiments, each of the set of compute nodes are physically separate from one another.

At block 920, the stream of tuples is processed. The stream of tuples is processed on a first compute node using the application bundle. The stream of tuples may be processed consistent with the description herein including FIGS. 1-6. The application bundle can process the stream of tuples without involvement from another compute node. Processing, using local management on the first compute node, of the stream of tuples may provide various flexibilities for the set of compute nodes.

At block 930, a staleness factor with respect to the application bundle is detected. The staleness factor is detected by the first compute node. Staleness can refer to a lack of freshness or relevancy. Detecting a staleness factor can include sensing a triggering event. For example, the staleness factor may include a temporal period which the application bundle is not in an execution state. The triggering event can include a benchmark temporal period which can be sensed/triggered when it matches/meets/reaches/exceeds the temporal period. In embodiments, the triggering event can be related aspects which are at least partially non-temporal.

In embodiments, the staleness factor with respect to the application bundle interrelates with the plurality of processing elements at block 933. For instance, the application bundle may be on the first compute node when the plurality of processing elements are initiated/started/commenced. The application bundle may be left/kept on the first compute node while processing by the plurality of processing elements occurs. The staleness factor may be based on a frame of reference from when processing begins, reaches a benchmark such as a quartile proportion, or finishes. For instance, in certain embodiments the application bundle may be removed once zero processing elements are running on that host (e.g., high file space usage and low expectation for processing element restart). In various embodiments, the application bundle may be kept for a temporal keeping period (e.g., waiting for at least three hours) until removing/deleting the application bundle due to non-use by a running processing element. The application bundle may be kept around to support the possibility of a new computer processing element being rescheduled onto the host (e.g., a computer processing element from an existing job, or a computer processing element from a newly submitted job).

In embodiments, detecting the staleness factor with respect to the application bundle includes a comparison at block 937 and a determination at block 938. An activity value of the application bundle can be compared with a threshold value at block 937. The activity value may be determined to be below the threshold value at block 938. For example, if the activity value is very low (e.g., 3 on a scale of 0 to 100) and the threshold value is greater (e.g., 10 on the scale of 0 to 100), the comparison may lead to a determination such as nearly completely stale. An algorithm which may be non-linear can be used such as analyzing using a normal distribution or a parabolic expression. A nearly completely stale application bundle may be kept for a shorter amount time than a somewhat stale application bundle. When resources are not limited, the application bundle may be kept longer. When resources are limited, a nearly completely stale application bundle can be removed in response to the determination it is nearly completely stale. The activity value may represent how inactive the application bundle has been in order to assist in determining how long to keep it on its host compute node.

At block 950, the application bundle on the first compute node is maintained. Maintain can include preserve, protect, sustain, uphold, renew, save, prolong, carry-on, or support. For example, the application bundle may be continued to be supported on the first compute node so as to sustain a prolonged ability to carry-on new operations. Maintaining the application bundle on the first compute node is based on a maintenance criterion related to both the application bundle and the plurality of processing elements. In embodiments, maintaining the application bundle includes a preservation (e.g., sustaining) at block 952 and a prevention (e.g., blocking, suppressing, precluding, stopping, prohibiting, disregarding, at least deterring) at block 953. The application bundle may be preserved/kept on the first compute node at block 952. Removal/deletion of the application bundle from the first compute node can be prevented at block 953.

In embodiments, the maintenance criterion includes a threshold temporal value at block 956. The threshold temporal value may include a policy choice to keep an application bundle for (at least) a specified amount of time (e.g., three hours). As such, the removal of the application bundle may occur only after the specified amount of time of an event (e.g., non-use) by a running processing element. The threshold temporal value may include a policy choice to keep an application bundle until a specified time (e.g., 08:00:00 AM). As such, the removal of the application bundle may occur only after the clock reaches the specified time. For example, the application bundle could be kept for overnight processing that may commence but removed at the beginning of a workday when resource demands may change. In embodiments, the threshold temporal value may be based on profile information for aspects of the system (e.g., historical information, predictive information, compute node history, job processing history, processing element usage).

In embodiments, the maintenance criterion includes a threshold computing resources value at block 957. The threshold computing resources value may correlate with a policy choice to utilize system resource factors to at least assist in determining staleness latency policy. For example, an application bundle may be maintained on a local compute node when computing resources are being used heavily (e.g., so as to not use resources removing/reinstalling the application bundle). In certain situations, however, a cost-benefit analysis may determine that it would be more efficient or lead to higher performance to expend the computing resources at a given marker in order to free up resources for a future marker. Another example may include not removing the application bundle until file space usage is greater than a threshold (e.g., keeping the application bundle until file space usage reaches 75% thereby having a desire for more space at that point). A processing factor or a memory factor for the local compute node are considered, as are a variety of factors related to bandwidth, flexibility, etc.

In embodiments, the maintenance criterion includes a threshold processing element accessibility value at block 958. The threshold processing element accessibility value may correlate with a policy choice having a desire/need for an efficient/fast processing element activation/restart. For example, a high-priority set of processing elements may have an accessibility policy which indicates that keeping stale application bundle(s) could prove useful (e.g., for a failover, for altering processing). To illustrate, using a scale of 0 to 100, a threshold processing element accessibility value may be set by a user to 80. When a high-priority set of processing elements is running on another compute node, a score of 90 may indicate to keep a stale version of the application bundle on the first compute node; however, a low-priority set of processing elements may have a score of 20 which can indicate not to keep stale application bundles. As such, the threshold processing element accessibility value can be indicative of a potential weightings with respect to security, performance, efficiency, etc.

In embodiments, the plurality of processing elements can be activated at block 971. Activating can include starting/restarting, stimulating, or prompting. When activating the plurality of processing elements, the application bundle may be used at block 972. The application bundle being used can be one or more which were considered stale but not deleted/removed. As such, staleness latency can be illustrated with respect to the application bundle by a sleep/hibernation phase followed by a resume/commencement phase.

Method 900 concludes at block 999. Aspects of method 900 may provide performance or efficiency benefits for managing an application bundle for processing a stream of tuples. For example, aspects of method 900 may include positive impacts with respect to responsiveness by maintaining a stale application bundle in a file system (e.g., staleness latency). Altogether, performance or efficiency benefits when managing an application bundle may occur (e.g., speed, flexibility, responsiveness, resource usage).

Figure 10:
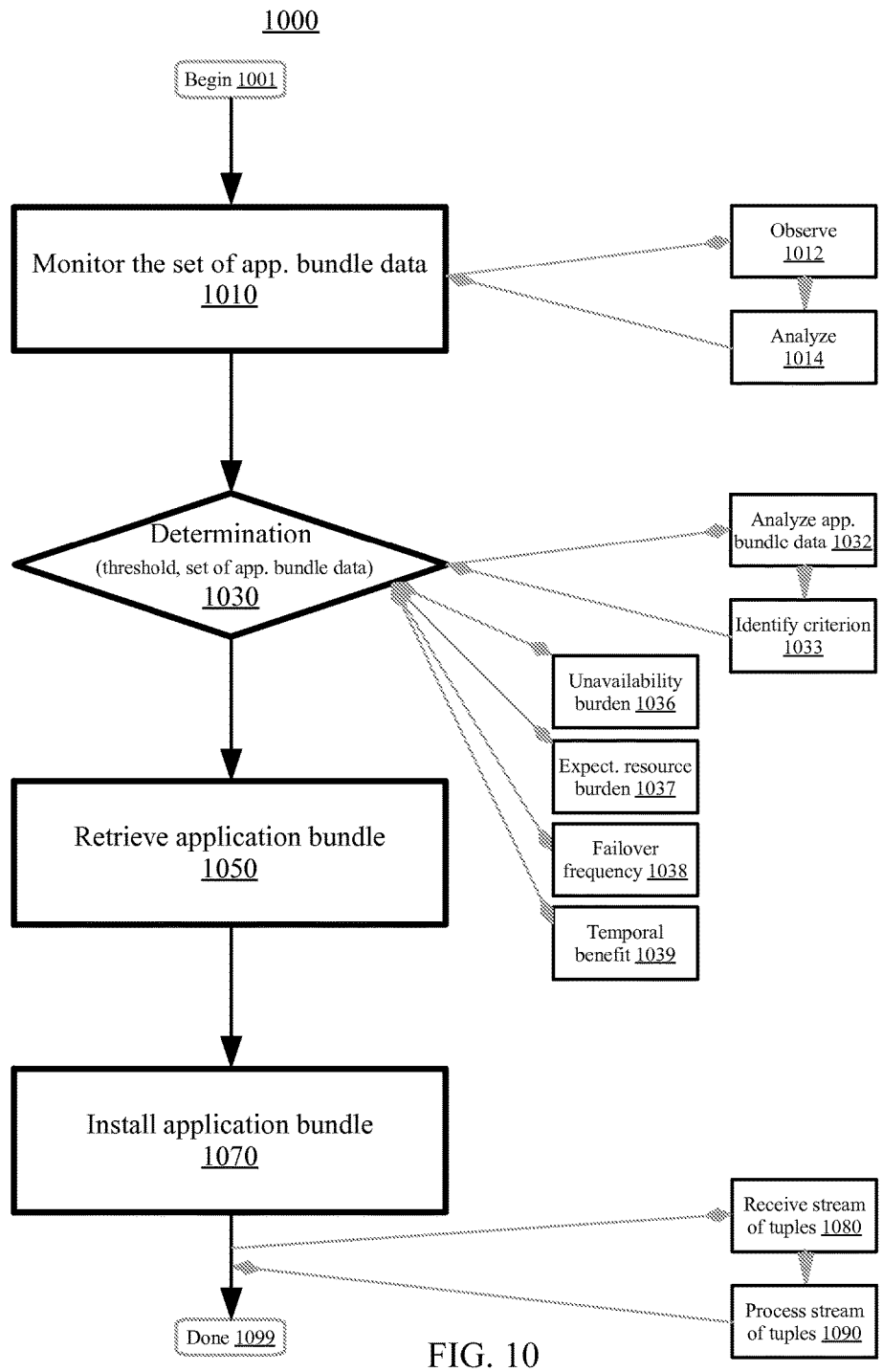
FIG. 10 is a flowchart illustrating a method for managing an application bundle for processing a stream of tuples according to embodiments.

FIG. 10 is a flowchart illustrating a method 1000 for managing an application bundle for processing a stream of tuples according to embodiments. Aspects can manage application bundle(s) (in a file system) by a local host which is distributed/separate from a central control host or a remote host that execution is intended for with respect to the application bundle(s). Backup of application bundle(s) (e.g., application bundle redundancy) may occur using a "pull" methodology. Backup can occur using a set of application bundle data. Aspects may backup an application bundle on a compute node based on susceptibility/vulnerability of the application bundle and provide an availability/reliability benefit such as providing another candidate source compute node for provisioning of the application bundle. Method 1000 may begin at block 1001.

At block 1010, a first compute node monitors the set of application bundle data related to both a set of compute nodes and the application bundle. For example, the first compute node may communicate with an application bundle directory (e.g., having the set of application bundle data). The application bundle directory can be stored separate from the set of compute nodes (e.g., the first and second compute nodes). In embodiments, monitoring the set of application bundles may include observing the set of application bundle data at block 1012. Also, monitoring the set of application bundles can include analyzing the set of application bundle data at block 1014. In certain embodiments, observing and analyzing can include aspects which receive an element and process the element that was received.

For instance, observing (at block 1012) can include querying (e.g., asking a question), searching (e.g., exploring for a reason), obtaining (e.g., recording a collection), probing (e.g., checking a property), scanning (e.g., reviewing a sample), or tracking (e.g., following a characteristic). To illustrate, observing may include locating, in the set of application bundle data, a group of specialized application bundles which can interpret the particularized subset of information to be found in tuples expected to be received for processing within a quickly-approaching temporal period.

For instance, analyzing (at block 1014) can include extracting (e.g., creating a derivation), examining (e.g., performing an inspection), dissecting (e.g., scrutinizing an attribute), parsing (e.g., deciphering a construct), comparing (e.g., relating an assessment), or classifying (e.g., assigning a designation). Data analysis may include a process of inspecting, cleaning, transforming, or modeling data to discover useful information, suggest conclusions, or support decisions. Data analysis can extract information/patterns from a data set and transform/translate it into an understandable structure (e.g., a data report which can be provided) for further use.

At block 1030, the first compute node determines that the application bundle is installed on fewer than a threshold number of compute nodes. The determination is made based on the set of application bundle data. The determination may be made by performing a comparison with respect to the threshold number of compute nodes and the set of application bundle data. For example, a count (of compute nodes having the application bundle installed) from the set of application bundle data may be calculated and subsequently compared with the threshold number of compute nodes. The threshold number of compute nodes can represent a number of candidate sources for the application bundle. For example, a policy decision can be made for how many candidate sources should be available for application bundle provisioning. The policy decision may be based on a nature to which a job would be affected if a host fails (e.g., recovery implications). In embodiments, determining the application bundle is installed on fewer than the threshold number of compute nodes includes an analysis at block 1032 and an identification at block 1033.

The set of application bundle data may be analyzed at block 1032. For instance, analyzing can include examining (e.g., performing an inspection of host/bundle-data), evaluating (e.g., generating an appraisal of host/bundle-data), resolving (e.g., ascertaining an observation/conclusion/answer with respect to host/bundle-data), parsing (e.g., deciphering a construct for the host/bundle-data), querying (e.g., asking a question regarding host/bundle-data), or categorizing (e.g., organizing by a feature of the host/bundle-data). A criterion can be identified at block 1033. The criterion may be identified in response to and based on the analysis at block 1032. The criterion can indicate to retrieve the application bundle from the second compute node. The criterion may be related to a variety of factors discussed herein. For instance, the criterion may correlate with an advantageous/favorable source (e.g., provides overall performance or efficiency benefits for the system by sourcing from a more favorable source rather than a less favorable source).

In embodiments, the threshold number of compute nodes is based on an unavailability burden criterion at block 1036. The unavailability burden criterion can indicate a challenge to the system if the application bundle became unavailable (e.g., by failure of all of the compute nodes which have the application bundle). Unavailability may indicate a total lack of availability (e.g., complete shutdown) or an effective lack of availability (e.g., challenged to process a threshold quantity of data). For example, if high availability is very important, three sources may be the threshold number of compute nodes in order to be able to recover from two hosts failing. As such, a bundle redundancy operation (e.g., backup) would be appropriate if fewer than three sources exist. Accordingly, if high availability is moderately important, two sources may be the threshold number of compute nodes in order to be able to recover from one host failing. As such, a bundle redundancy operation (e.g., backup) would be appropriate if fewer than two sources exist.

In embodiments, the threshold number of compute nodes is based on an expected resource burden criterion at block 1037. The expected resource burden criterion can indicate a challenge to system resources with respect to future processing. A resource burden may include bandwidth, processing speed/power, memory factors, etc. An expected resource burden may have a predicted/forecast value for the resource burden. The expected resource burden may be based on profile information (e.g., historical, random, predetermined). For example, the expected resource burden criterion can utilize a comparison of a component of the expected resource burden with a threshold value (e.g., which may be related to the profile information). As such, if processing power is expected to be limited due to high usage, an additional host having the application bundle may be of benefit so long as it can be downloaded/installed prior to the period of high usage. Accordingly, backing-up the application bundle based on the expected resource burden criterion indicating three sources may be useful tomorrow could initiate an action to add a redundant application bundle when only two hosts currently have the application bundle. In certain embodiments, it may be desirable to immediately back-up the application bundle upon start-up so that error event(s) that occur relatively early in a processing process do not cause substantial delay(s) due to a lack of resources.

In embodiments, the threshold number of compute nodes is based on a failover frequency criterion at block 1038. The failover frequency criterion can indicate a failure rate. The failure rate may be for the set of compute nodes, for a particular compute node such as the second compute node, or the application bundle. In certain embodiments, the failure rate may include a typology for such aspects (e.g., a type of application bundle, a type of compute node). For example, a larger threshold number of compute nodes may be determined for compute nodes that are challenged more frequently (e.g., higher failure rate). As such, more redundant application bundles on more compute nodes may be generated (e.g., by pulling the application bundle from a remote host to a local host). For stable application bundles and compute nodes, the threshold number of compute nodes may be lower (e.g., lower failover frequency). In this way, performance or efficiency benefits may result.

In embodiments, the threshold number of compute nodes is based on a temporal benefit criterion for processing the stream of tuples within a threshold temporal period at block 1039. The temporal benefit criterion can indicate a benefit/value (e.g., cost savings, energy savings, contractual incentives) arising out of timely performance for processing the stream of tuples within a threshold temporal period (e.g., within one hour, by midnight, before the end of the third quarter of the fiscal year). The benefit/value may have one or more tiers/levels which can relate to a desire for bundle redundancy. For example, a significant benefit/value can correlate to a higher desire for backups than a negative or no benefit/value for performing a task in a timely manner. As such, if an agreement provides a 150% incentive for early performance of a task by one day, the temporal benefit criterion may be determined to increase the threshold number of compute nodes so that the earlier performance is more likely to be met (e.g., as opposed to a task that presents no benefit for early performance where bundle redundancy may be less likely to benefit the system). A variety of combinations/permutations of embodiments incorporating aspects of the various criteria are contemplated (e.g., unavailability burden criterion plus failover frequency criterion).

At block 1050, the application bundle is retrieved. The application bundle may be retrieved by the first compute node (e.g., pulled by the first compute node from the second compute node). The application bundle may be retrieved in response to determining the application bundle is installed on fewer than a threshold number of compute nodes. Retrieving the application bundle may include copying or moving the application bundle. Retrieving the application bundle can include at least one of transmitting a request for the application bundle, obtaining the application bundle, or receiving the application bundle. In certain embodiments, retrieving can include selectively retrieving chosen elements of the application bundle to subsequently generate a like version of the application bundle by a piecemeal methodology.

At block 1070, the application bundle is installed on the first compute node (in response to retrieving the application bundle). The first compute node manages the installation. Using the first compute node to manage the installation can facilitate the pull methodology. In embodiments, managing the installation can include, for example, retrieval aspects (see block 735 of FIG. 7). Installing may include initiation/commencement of a deployment/placement/installation/allocation. Installing the application bundle may include creating a local copy/version of the application bundle on the first compute node. Installing the application bundle can generate a like version of the application bundle by a piecemeal methodology (e.g., fit together various components). Installation can have a verification phase which verifies operability or completeness. Installation may include unwrapping a wrapped data packet (e.g., which has encryption technology for security/transmission purposes).

In embodiments, the stream of tuples to be processed by a plurality of processing elements operating on a set of compute nodes can be received at block 1080. The stream of tuples may be received consistent with the description herein including FIGS. 1-6. Current/future processing by the plurality of processing elements may be performed consistent with the description herein including FIGS. 1-6. The set of compute nodes may include a shared pool of configurable computing resources. For example, the set of compute nodes can be a public cloud environment, a private cloud environment, or a hybrid cloud environment. In certain embodiments, each of the set of compute nodes are physically separate from one another.

In embodiments, using the application bundle on the first compute node, the stream of tuples may be processed at block 1090. The stream of tuples may be processed subsequent to/in response to installing the candidate application bundle on the first compute node (see block 1070). As such, the candidate application bundle can be backed-up so as to be ready for use when called-upon. The stream of tuples may be processed consistent with the description herein including FIGS. 1-6. Processing, using local management on the first compute node, of the stream of tuples may provide various flexibilities for the set of compute nodes.

Method 1000 concludes at block 1099. Aspects of method 1000 may provide performance or efficiency benefits for managing an application bundle for processing a stream of tuples. For example, aspects of method 1000 may include positive impacts with respect to reliability (e.g., to process a higher ratio of tuples without overlooking a threshold number of tuples) by backing-up a particular application bundle in a file system. Altogether, performance or efficiency benefits when managing an application bundle may occur (e.g., speed, flexibility, responsiveness, resource usage).

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for managing a plurality of application bundles for processing a stream of tuples, the method comprising:
    receiving the stream of tuples to be processed by a plurality of processing elements operating on a set of compute nodes;
    executing, on a first compute node using a plurality of application bundles, the stream of tuples;
    monitoring, by an application bundle monitor, which application bundle is executing the stream of tuples, wherein the application bundle monitor controls a policy setting for the first compute node, and wherein the policy setting is selected from the group consisting of a computing resource, a job status, a processing element status and a configuration;
    detecting, by the application bundle monitor, a first application bundle is executing the monitored stream of tuples;
    detecting, by the application bundle monitor, the monitored stream of tuples are finished being executed by the first application bundle;
    determining, by the first compute node, a staleness factor of the first application bundle has exceeded a policy setting threshold value of the first compute node, wherein the staleness factor is determined by considering a policy setting of the first node and the activity value of the first application bundle, wherein a policy setting threshold value comprises a threshold temporal value, threshold computing resources value, and a threshold processing element accessibility value;
    and removing, by the first compute node, the first application bundle.

2. The method of claim 1, wherein using the application bundle when activating the plurality of processing elements.

3. The method of claim 1, wherein the staleness factor with respect to the application bundle interrelates with the plurality of processing elements.

* * * * *